UNITED STATES PATENT OFFICE.

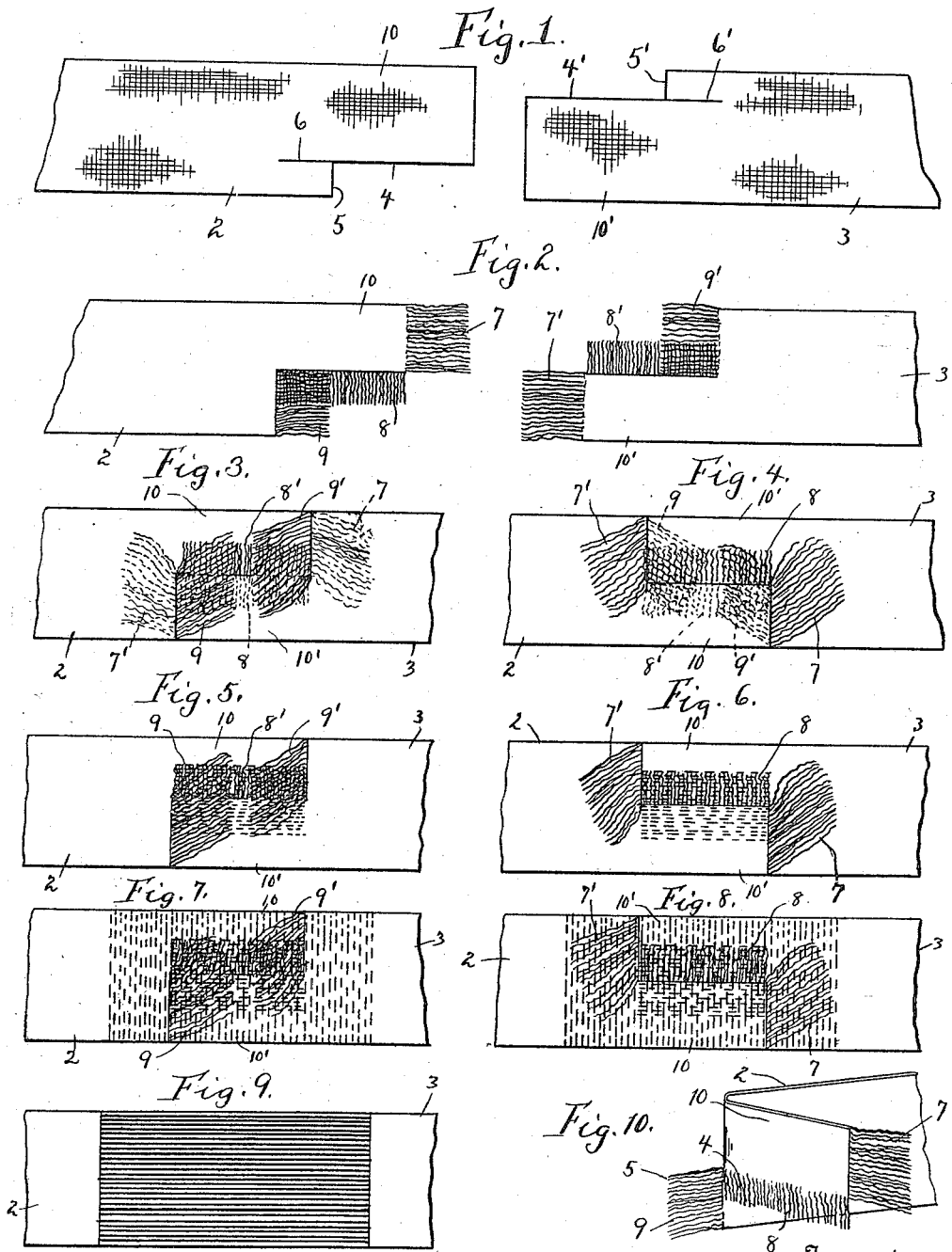

OTTO E. GEISEL, OF PHILADELPHIA, PENNSYLVANIA.

METHOD FOR JOINING WOVEN BELTS.

1,261,118.   Specification of Letters Patent.   Patented Apr. 2, 1918.

Application filed June 15, 1916.   Serial No. 103,820.

*To all whom it may concern:*

Be it known that I, OTTO E. GEISEL, a subject of the Emperor of Germany, residing at Philadelphia, in the county of Philadelphia and State of Pennsylvania, have invented new and useful Improvements in Methods for Joining Woven Belts, of which the following is a specification.

My invention relates to new and useful improvements in method for joining the ends of woven belts, and has for its object to provide a method whereby the ends of a woven belt may be joined together strongly without materially increasing the thickness of the belt at that point.

A further object of the invention is to improve joints of this character so that the longitudinal center thereof will be as strong as the balance of the joint which is essential where the belt is used to transmit power from one pulley to another on high speed machinery.

With these ends in view this invention consists in the details of construction and combination of elements hereinafter set forth and then specifically designated by the claims.

In order that those skilled in the art to which this invention appertains may understand how to make and use the same, I will describe its construction in detail, referring by numeral to the accompanying drawing forming a part of this specification, in which—

Figure 1, is a face view of the meeting ends of a belt showing how the same is cut ready to be unraveled.

Fig. 2, is a similar view showing the two ends unraveled and prepared for joining.

Fig. 3, is a similar view of the obverse side showing the ends of the belt joined together.

Fig. 4, is a similar view of the reverse side.

Fig. 5, is an obverse face view of the meeting ends of the belt joined together and stitched longitudinally.

Fig. 6, is a similar view of the reverse side.

Fig. 7, is a similar view of the obverse side, showing the next step having the transverse stitching.

Fig. 8, is a similar view of the reverse side.

Fig. 9, is a face view of the completed joint; and

Fig. 10, is a perspective view of one of the unraveled ends of the belt, more plainly illustrating how the belt appears after the threads have been pulled out.

In carrying out my invention as here embodied 2 and 3 represent the meeting ends of a belt to be joined and are prepared in the following manner:

Each end of the belt is slit longitudinally as at 4 from the end a short distance into the belt and to one side of the longitudinal center thereof. Then a cross or transverse slit is made as at 5 from one side into the belt until it meets the slit 4 intermediate the ends of said slit, thus entirely removing one corner, leaving an auxiliary slit 6 projecting into the body of the belt from the cross slit 5. Then the weft threads are removed from the end of the belt a short distance into the body of said belt, leaving the warp threads exposed as at 7. Then the warp threads are removed from the end of the belt between the slit 4 and the longitudinal center of the belt leaving the weft threads exposed as at 8 from the outer end of the unraveled portion of the belt to the end of the auxiliary slit 6. Then the weft threads are removed from the slit 5 into the body of the belt as far as the end of the auxiliary slit 6, leaving the warp threads exposed as at 9, these being cut off along the line of the slit 5 so that the portions of the weft threads as at 8 and a portion of the warp threads as at 9 overlap one another as plainly shown in Fig. 2.

I have here described how one end of the belt is prepared, and the other end of the belt is prepared in the same manner except that it is reversed and the corresponding slits in this other end are numbered 4', 5', 6', 7', 8' and 9'.

The ends of the belt are next impregnated with a rubber cement and the warp threads 7, 7' and 9, 9', or the unraveled ends are spread apart to reduce the thickness, and bent inward toward the longitudinal center of the belt as will be more plainly shown in Figs. 3 and 4, after which the unraveled end or warp threads 7' are passed through the slit 5 or beneath the unraveled end or warp threads 9, and so the unraveled end or warp threads 7' will underlie the solid portion of the belt to the rear of the unraveled end or toward threads 7' and will underlie the solid portion of the belt to the rear of the unraveled end or warp threads 9 and said unraveled end or warp threads 9 will overlie the solid portion of the belt to the rear of the unraveled or warp threads 7'.

When these meetings ends are brought together in the manner described, the unraveled edge of the projecting end 10 of the belt or weft threads 8 will underlie the solid portion of the corresponding projecting end 10' of the opposite meeting end of the belt and the unraveled edge of the projecting end 10' or weft threads 8' will overlie the solid portion of the projecting end 10 of the belt and the unraveled end or warp threads 7 will underlie the solid portion of the belt to the rear of the unraveled portion or warp threads 9' and the unraveled end or warp threads 9' will overlie a portion of the unraveled edge or weft threads 8' and the solid portion of the projection 10 of the belt to the rear of the unraveled end or warp threads 7, all of which is more plainly shown in the obverse and reverse views of Figs. 3 and 4 respectively.

After the ends are so joined they are securely pressed together and will adhere to one another because of the rubber cement or other adhesive with which the ends of the belt are impregnated.

By joining the ends of a belt in this manner there will not be any portion of the joint where two solid portions of the belt come against one another and in this way the thickness of the joint will not be materially increased and the spreading of the warp threads will further reduce the thickness of the material at the joint and produce a more even running surface by the equal distribution of the unraveled ends over the entire width. After the two ends are placed in this position they are stitched through and through longitudinally over the region of the belt where the weft threads 8 and 8' lie as shown in the obverse and reverse face views of the joint in Figs. 5 and 6 respectively. After stitching the belt in this manner it is again stitched through and through transversely over the entire region of the joint as shown in Figs. 7 and 8, thereby producing an exceedingly strong joint, in which the flexibility of the belt has not been damaged to any great extent.

The belt is then subjected to considerable pressure at the joint so that a smooth running surface is produced, and the parts embedded into each other, so that the belt is approximately the same thickness throughout, and if found desirable a thin coating of rubber 11 may be vulcanized upon each side as shown in Fig. 9, and then will protect the stitching from being worn in traveling around the pulleys.

Of course I do not wish to be limited to the exact details of construction as herein shown, as these may be varied within the limits of the appended claims without departing from the spirit of my invention.

Having thus fully described my invention, what I claim as new and useful, is—

1. The herein described method of joining the ends of web belting, consisting in slitting the belt in from the ends adjacent opposite edges, then slitting each end of the belt in from one edge to the longitudinal slit intermediate the ends of the last named slit, then unraveling the warp threads along the entire edge formed by the longitudinal slit, then cutting off said unraveled warp threads on the line of the second named slit, then removing the weft threads inward from the end the desired distance and inward from the transverse slit to the inner end of the longitudinal slit, then placing the ends of the belt together so that no two solid portions will overlap one another and then fastening said ends together.

2. The herein described method of joining the ends of web belting, consisting in slitting the belt in from the ends adjacent opposite edges, then slitting each end of the belt in from one edge to the longitudinal slit intermediate the ends of the last named slit, then unraveling the warp threads along the entire edge formed by the longitudinal slit, then cutting off said unraveled warp threads on the line of the second named slit, then removing the weft threads inward from the end the desired distance and inward from the transverse slit to the inner end of the longitudinal slit, then impregnating the ends with a suitable adhesive, then placing the two ends together so that no two solid portions will overlap one another and then fastening said two ends together.

3. The herein described method of joining the ends of web belting, consisting in slitting the belt in from the ends adjacent opposite edges, then slitting each end of the belt in from one edge to the longitudinal slit intermediate the ends of the last named slit, then unraveling the warp threads along the entire edge formed by the longitudinal slit, then cutting off said unraveled warp threads on the line of the second named slit, then removing the weft threads inward from the end the desired distance and inward from the transverse slit to the inner end of the longitudinal slit, then placing the two ends together so that no two solid portions will overlap one another, then stitching the belt longitudinally throughout the region covered by the weft threads and then stitching the belt through and through transversely throughout the entire region of the joint.

4. The herein described method of joining the two ends of web belting, consisting in slitting the belt in from the ends adjacent opposite edges, then slitting each end of the belt in from one edge to the longitudinal slit intermediate the ends of the last named slit, then unraveling the warp threads along the entire edge formed by the longitudinal slit, then cutting off said unraveled warp threads on the line of the second named slit, then removing the weft threads inward from the end the desired distance and inward from the transverse slit to the inner end of the longitudinal slit, then placing the two ends together so that no two solid portions will overlap one another, then stitching the belt longitudinally throughout the region covered by the weft threads, then stitching the belt through and through transversely throughout the entire region of the joint and then subjecting the joint to pressure.

5. The herein described method of joining the two ends of web belting, consisting in slitting the belt in from the ends adjacent opposite edges, then slitting each end of the belt in from one edge to the longitudinal slit intermediate the ends of the last named slit, then unraveling the warp threads along the entire edge formed by the longitudinal slit, then cutting off said unraveled warp threads on the line of the second named slit, then removing the weft threads inward from the end the desired distance and inward from the transverse slit to the inner end of the longitudinal slit, then placing the two ends together so that no two solid portions will overlap one another, then stitching the belt longitudinally throughout the region covered by the weft threads, then stitching the belt through and through transversely throughout the entire region of the joint, then covering the joint with rubber and subjecting the same to pressure and heat.

6. The herein described method of joining the ends of web belting, consisting in slitting the belt in from the ends adjacent opposite edges, then slitting each end of the belt in from one edge to the longitudinal slit intermediate the ends of the last named slit, then unraveling the warp threads along the entire edge formed by the longitudinal slit, then cutting off said unraveled warp threads on the line of the second named slit, then removing the weft threads inward from the end the desired distance and inward from the transverse slit to the inner end of the longitudinal slit, then impregnating the ends of the belt with rubber cement, then bending the unraveled ends inward toward the longitudinal center of the belt, then placing the ends together so that the unraveled portions of the projecting ends underlie the solid portions of the body of the belt, so that the unraveled weft threads overlie the solid portions of the projecting ends and so that the remaining unraveled ends or short exposed warp threads overlie the solid portions of the projecting ends adjacent their outer ends and then stitching the joint through and through longitudinally and transversely.

In testimony whereof, I have hereunto affixed my signature in the presence of a subscribing witness.

OTTO E. GEISEL.

Witness:
W. HAMILTON ROSE.

Copies of this patent may be obtained for five cents each, by addressing the "Commissioner of Patents, Washington, D. C."